US008725586B2

(12) United States Patent
Levin

(10) Patent No.: US 8,725,586 B2
(45) Date of Patent: May 13, 2014

(54) ACCOUNTING SYSTEM AND MANAGEMENT METHODS OF TRANSACTION CLASSIFICATIONS THAT IS SIMPLE, ACCURATE AND SELF-ADAPTING

(76) Inventor: Douglas Levin, Kahului, HI (US)

(*) Notice: Subject to any disclaimer, the term of this patent is extended or adjusted under 35 U.S.C. 154(b) by 0 days.

(21) Appl. No.: 13/396,415

(22) Filed: Feb. 14, 2012

(65) Prior Publication Data

US 2013/0046661 A1 Feb. 21, 2013

Related U.S. Application Data

(60) Provisional application No. 61/524,654, filed on Aug. 17, 2011.

(51) Int. Cl.
*G06Q 30/00* (2012.01)

(52) U.S. Cl.
USPC ........................................ 705/26.4; 705/26.8

(58) Field of Classification Search
USPC .......... 705/2, 26.1, 28, 30, 34, 35, 38, 40, 44
See application file for complete search history.

(56) References Cited

U.S. PATENT DOCUMENTS

| | | | | |
|---|---|---|---|---|
| 5,748,908 A * | 5/1998 | Yu | ..................................... | 705/44 |
| 6,871,789 B2 * | 3/2005 | Hilton et al. | .................. | 235/494 |
| 6,957,191 B1 * | 10/2005 | Belcsak et al. | .................. | 705/38 |
| 7,240,028 B1 * | 7/2007 | Rugge | .............................. | 705/30 |
| 7,568,211 B2 * | 7/2009 | Mai et al. | ......................... | 725/35 |
| 7,574,659 B2 * | 8/2009 | Szabo | ........................... | 715/738 |
| 7,729,959 B1 * | 6/2010 | Wells et al. | ...................... | 705/30 |
| 7,810,084 B2 * | 10/2010 | Egetoft | .......................... | 717/149 |
| 7,967,211 B2 * | 6/2011 | Challa et al. | ............. | 235/462.46 |
| 8,065,232 B2 * | 11/2011 | Hogl | ................................ | 705/40 |
| 8,370,362 B2 * | 2/2013 | Szabo | ........................... | 707/739 |
| 8,392,266 B2 * | 3/2013 | Lombardi | ..................... | 705/26.1 |
| 8,442,881 B2 * | 5/2013 | Patel | ................................ | 705/30 |
| 8,515,836 B1 * | 8/2013 | Keld | ................................ | 705/28 |
| 8,527,375 B1 * | 9/2013 | Olim | ................................ | 705/30 |
| 8,566,238 B2 * | 10/2013 | Hogl | ................................ | 705/40 |
| 8,639,522 B2 * | 1/2014 | Pathria et al. | ..................... | 705/2 |

* cited by examiner

*Primary Examiner* — Andrew Joseph Rudy
(74) *Attorney, Agent, or Firm* — Sheldon Mak & Anderson PC; Norman R. Van Treeck

(57) ABSTRACT

A computer implemented method for categorizing transactions for a user comprising receiving a plurality of transactions, each transaction including a transaction party, a date associated with the transaction, and a transaction amount, providing a set of transaction categories, automatically associating one of the transaction categories with at least one of the received transactions from the set of transaction categories, providing a set of reliability codes comprising at least two reliability codes, selecting a reliability code from the set of reliability codes for at least one of the automatically selected transaction categories, and displaying at least one of the received transactions with its selected reliability code.

7 Claims, 18 Drawing Sheets

ACCOUNTING SYSTEM AND MANAGEMENT METHODS OF TRANSACTION CLASSIFICATIONS THAT IS SIMPLE, ACCURATE AND SELF-ADAPTING

CROSS REFERENCE TO RELATED APPLICATION

This application claims the benefit of U.S. Provisional Patent Application Ser. No. 61/524,654, titled "An Accounting System And Management Methods Of Transaction Classifications That Is Simple, Accurate And Self-Adapting", filed on Aug. 17, 2011 the contents of which are incorporated in this disclosure by reference in their entirety.

FIELD OF THE INVENTION

The present invention relates to accounting systems, more specifically to an accounting system and management methods of transaction classifications that is simple, accurate and self-adapting.

BACKGROUND

There are many accounting systems available for consumers and business. Among these systems there are two separate types: those that require manual classification of transactions; and those that attempt to automatically classify transactions. Advantageously, manual classifications systems are arguably the most accurate, because every transaction must be reviewed. However, if more than one person is reviewing the items, they may be accidentally classified incorrectly. Automatic classification systems advantageously attempt to consistently classify transaction based upon the name or type of the transaction, or a previous classification. Disadvantageously, the automatic systems do not automatically correct mistakes in classifications, nor can the systems learn and adapt to varying entries that the system has not encountered previously. Therefore there is a need for an accounting system and management methods of transaction classifications that is simple, accurate and self-adapting.

SUMMARY

The present invention overcomes the limitations of the prior art by providing a computer implemented method for categorizing transactions. The instructions comprise: a) receiving a plurality of transactions, each transaction including a transaction party, a date associated with the transaction, and a transaction amount; b) providing a set of transaction categories; c) automatically associating one of the transaction categories with at least one of the received transactions from the set of transaction categories; d) providing a set of reliability codes comprising at least two reliability codes; e) selecting a reliability code from the set of reliability codes for at least one of the automatically selected transaction categories; and f) displaying at least one of the received transactions with its selected reliability code.

The reliability codes can be colors, numbers, animations and glyphs, but preferably color. Additionally, the transaction party is also displayed in the color of the reliability code. The set of reliability codes comprises a code for a transaction category selected by the user and a code for a received transaction that does not have an automatically selected transaction category.

The step of automatically selecting a transaction category comprises selecting a transaction category based on transaction categories used by other users and the set of reliability codes comprises a code for transactions categorized based on transaction categories used by other users.

Also, there is provided a computer implemented method for categorizing transactions for a user comprising: a) providing a set of transaction categories; b) displaying a plurality of transactions, each transaction having transaction information, the transaction information comprising a transaction party, a date associated with the transaction, and a transaction amount, at least some of the transactions having one of the transaction categories displayed and a reliability code for the categorization; c) receiving from the user a transaction category for a selected one of the received transactions from the set of transaction categories; and d) after step (c), displaying the selected one of the received transactions with the transaction category received from the user and with the reliability changed.

Additionally, there is provided a computer implemented method for categorizing transactions for a user comprising: a) receiving a plurality of transactions, each transaction including a transaction party, a date associated with the transaction, and a transaction amount; b) providing a set of transaction categories; and c) automatically associating one of the transaction categories with at least one of the received transactions based on transaction categories used by other users for the same transaction party. The method further comprising the step of associating a business code with the user, and wherein step (c) comprises automatically associating the same transaction category used by another user having the same business code. The method also comprising the step of associating a zip code with the transaction party, and wherein step (c) comprises automatically associating one of the transaction categories based on the category used by another user with a transaction party having the same zip code and same name.

In another embodiment, there is provided a computer implemented method for categorizing transactions from a set of categories for a selected user of a plurality of users, the method comprising: a) receiving for the selected user a plurality of transactions, each transaction including a transaction party, a date associated with the transaction, and a transaction amount; b) providing a set of transaction categories; and c) automatically associating one of the transaction categories with at least one of the received transactions based on transaction categories used by a selected subset of the plurality of users for at least 80% of their respective transactions. In some cases, the selected subset comprises users having substantially all transactions associated with a transaction category. In other cases the set of transaction categories comprises a standardized set of categories, and at least some of the users have a user selected transaction category, or only from the standardized set of categories.

In another embodiment, there is provided a computer implemented method for categorizing transactions for a user comprising: a) providing a set of transaction categories; b) displaying a plurality of transactions, each transaction having transaction information, the transaction information comprising a transaction party, a date associated with the transaction, and a transaction amount, at least some of the transactions having one of the transaction categories displayed and a reliability code for the categorization; c) receiving a categorization rule from the user, the categorization rule specifying a transaction category based on the transaction party and a date range comprising at least one date; and d) automatically associating the specified transaction category with at least one of the received transactions based on the categorization rule. Also, there are multiple transactions for the user with the same transaction party, and the most recent transaction for the same transaction party has a different transaction category than the specified transaction category.

In another embodiment there is provided a computer implemented method for categorizing transactions for a user comprising: a) providing a set of transaction categories; b) displaying at least one incomplete transaction, the incomplete transaction having transaction information, the transaction information comprising a transaction party code, a date associated with the transaction, and a transaction amount and no transaction category; c) providing a user interface for the user to provide (i) a transaction category for the incomplete transaction from the set of transaction categories and (ii) a transaction party corresponding to the transaction party code; and d) displaying the transaction with the transaction category received from the user only if the user provides the transaction party for the transaction.

In a further embodiment, there is provided a computer implemented method for matching transactions from a first user account and second user account by: a) receiving a plurality of first transactions for the first user account, each transaction including a transaction party, a date associated with the transaction, and a transaction amount, the first transactions including at least one outgoing payment; b) receiving a plurality of second transactions for the second user account, each transaction including a transaction party, a date associated with the transaction, and a transaction amount, the second transaction including at least one receiving payment associated with the outgoing payment; c) placing the transaction data for the outgoing payment and the receiving payment into the same temporary storage for matching; and d) matching in temporary storage the outgoing payment and the receiving payment. Additionally, the date associated with the outgoing payment is different than the date associated with the receiving payment.

In another embodiment, there is provided a non-transitory machine-readable system comprising machine-readable instructions for performing instructions stored in a storage. The system comprising: a) One or more than one processor to perform the instructions; b) a storage operably connected to the one or more than one processor for storing executable instructions and data; b) one or more than one user terminals for accessing the executable instructions stored on the storage; c) instructions for storing a plurality of input transaction categories input from a plurality of users stored on the storage; and d) categorization instructions for executing one or more than one transaction categorization algorithm. The system further comprises non-transitory machine-readable instructions stored in a storage for categorizing transactions for a user comprising: a) machine-readable instructions for receiving a plurality of transactions, each transaction including a transaction party, a date associated with the transaction, and a transaction amount; b) machine-readable instructions for providing a set of transaction categories; c) machine-readable instructions for automatically associating one of the transaction categories with at least one of the received transactions from the set of transaction categories; d) machine-readable instructions for providing a set of reliability codes comprising at least two reliability codes; e) machine-readable instructions for selecting a reliability code from the set of reliability codes for at least one of the automatically selected transaction categories; and f) machine-readable instructions for displaying at least one of the received transactions with its selected reliability code, where the reliabilities codes are different colors. Also, the machine-readable instructions for transaction party display the color of the reliability code. Additionally, the set of reliability codes comprises a code for a transaction category selected by the user. Moreover, the set of reliability codes comprises a code for a received transaction that does not have an automatically selected transaction category. The machine-readable instructions for automatically selecting a transaction category comprises instructions for selecting a transaction category based on previously stored transaction categories used by other users. The machine-readable instructions for automatically selecting a transaction category comprises instructions for selecting a transaction category based on transaction categories used by other users.

Also provided is a computer implemented method for categorizing transactions for a user comprising: a) providing a set of transaction categories; b) storing one or more than one incomplete transaction, the incomplete transaction having transaction information, the transaction information comprising a transaction party code, a date associated with the transaction, and a transaction amount and no transaction category; c) providing a user interface for the user to provide (i) a transaction category for the incomplete transaction from the set of transaction categories and (ii) a transaction party corresponding to the transaction party code; and d) displaying the transaction with the transaction category received from the user only if the user provides the transaction party for the transaction. Also, the user selects the incomplete transactions to be stored using a graphical user interface and the selected incomplete transactions are selected from an uncategorized transaction, a crowd sourced transaction, an automatically categorized transaction or any combination thereof.

BRIEF DESCRIPTION OF THE DRAWINGS

These and other features, aspects and advantages of the present invention will become better understood with regard to the following description, appended claims, and accompanying figures where:

FIG. 13 is a screenshot of the system of FIG. 1 displaying a payee edit screen;

FIG. 14 is a screenshot of the system of FIG. 1 displaying advanced categorization options for the system;

DETAILED DESCRIPTION

Figure 1:
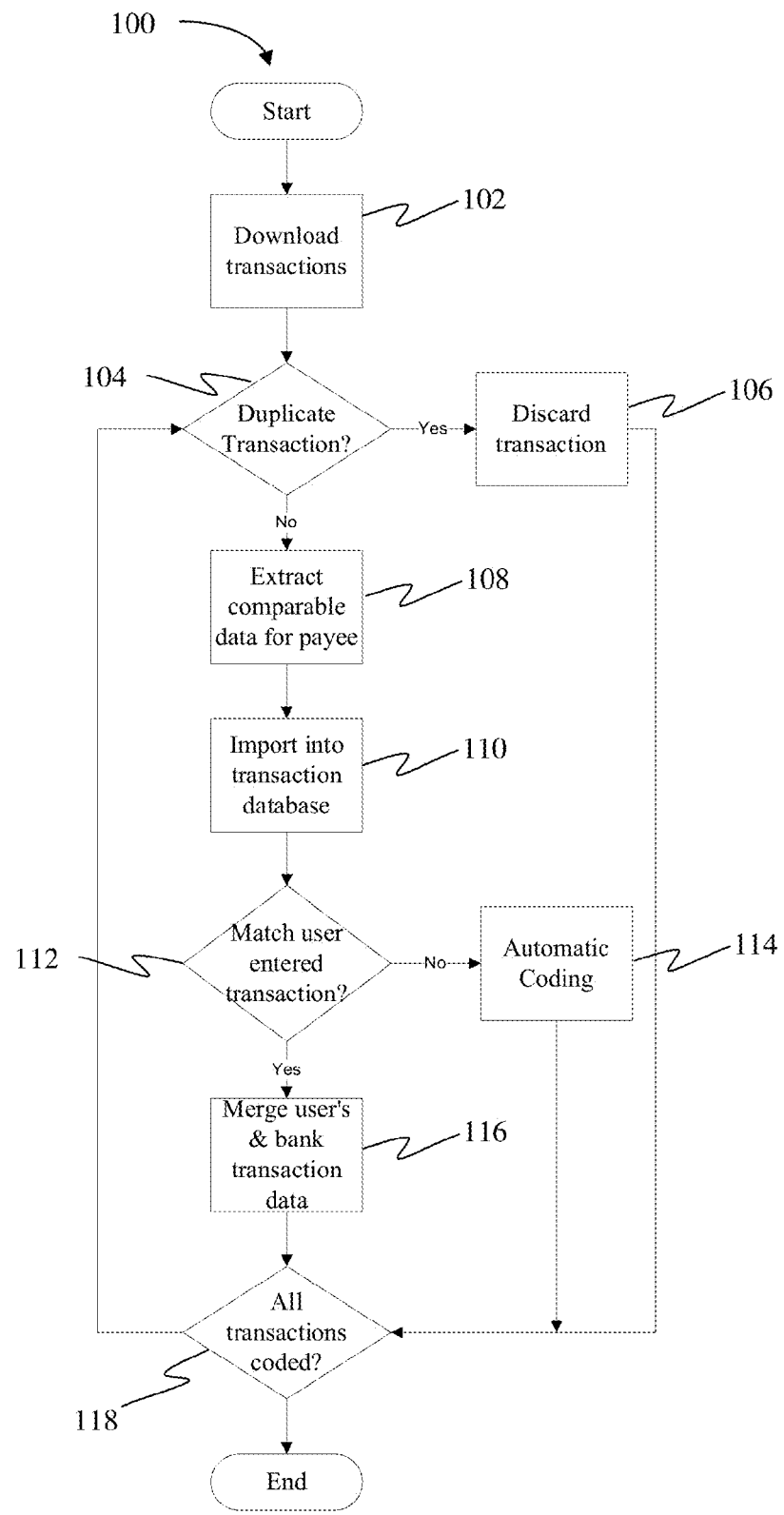
FIG. 1 is a flowchart diagram of a system for an accounting system and management methods of transaction classifications that is simple, accurate and self-adapting.

The present invention overcomes the limitations of the prior art by providing an accounting system and management methods of transaction classifications that is simple, accurate and self-adapting. The system is based on a standard chart of accounts that has been designed to handle the majority of small businesses on either the cash or accrual method of accounting whose annual activities are not materially greater than $1,000,000. Having a standard chart of accounts, although limiting to sophisticated users, simplifies the setup of the system and greatly simplifies the processing of as well as improving the statistical likelihood of crowd sourcing transaction categorization. In its absence, the rules established by one user to classify a payee to a particular General Ledger (GL) account would not be useful to another user of the system.

User created default coding rules for each of their payees. Users will be prompted to create a default general ledger account classification for each payee or vendor they establish in the system. For example, a restaurant might establish a rule coding purchases from "Safeway" as "Food Inventory", while an auto repair shop might make the default general ledger account "Owner Draw" as its normally groceries for his home.

Advanced user created rules. The user will also be able to establish any number of advanced coding rules for each payee or vendor in the accounting system. These advanced rules will allow the system to identify transactions that do not fit the default profile. The rules will offer the following factors to differentiate payments to the same vendor: transaction day of the period (month, quarter, year), amount, and source bank account the transaction was paid from. For example, user may have multiple monthly transactions with State Farm Insurance, which should be classified separately as "Business Liability", "Auto", "Worker's Compensation" and "Officer's Life" insurance. By allowing user to create rules which look at the transaction amounts, which all differ slightly, the system will be able to automatically code these transactions to the correct general ledger account.

Applicable dates for advanced user created rules. Advanced user rules for classifying transactions rely upon specifics like transaction amount that can change over time. By establishing a period for which the rule is active, a rule can be retired and replaced with a revised rule as the situation adjusts. For example, in June of 2011 the State Farm Insurance transaction which normally is for $80.14 is classified as "Officer's Life", but in July the premium for that insurance increases to $112.44. The old rule can be retired as of Jun. 30, 2011, and the new rule take effect as of Jul. 1, 2011.

User prompted to create rules. At various established points in the user interface where the user has the opportunity to classify transactions, the system will prompt them to establish a default rule or an advanced rule if none exists.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention.

Various embodiments provide a device and a method for a remote control for portable electronic devices that is simple operate and operable with a single hand. One embodiment of the present invention provides a system comprising one or more portable electronic device and one or more remote control for portable electronic devices. In another embodiment, there is provided a method for using the system. The system and method will now be disclosed in detail.

Referring now to FIG. 1, there is shown a flowchart diagram 100 of a system for an accounting system and management methods of transaction classifications that is simple, accurate and self-adapting. The system is a comprehensive system for automatically classifying and managing user transactions using crowd sourcing and other methods. The system provides a comprehensive method for determining the payee and appropriate general ledger account classification of transactions automatically imported into a specifically designed computerized accounting system which system alerts the user to the quality of the automatic categorization of both a particular transaction as well as of their books as a whole, allowing them to focus their attention on those transactions which require it most.

The system comprises a computer implemented method for categorizing transactions for a user comprising the steps of first receiving a plurality of transactions 102, each transaction including a transaction party, a date associated with the transaction, and a transaction amount. Then, determining if any of the transactions are duplicates 106. Next, if the transaction is a duplicate 106 it is discarded. Then, data for a payee is extracted 108 from the transaction. Next, the extracted data 108 is imported into a transaction database 110. Then, a determination 112 is made whether the transaction data matches a user entered transaction previously stored in the system. If the transaction does not match, then the process shifts to automatic coding 114. However, if the transaction does match a user entered transaction 112, then the transaction data is merged with the users bank transaction data that is stored on the system. Next, the downloaded transactions are checked 118 to see if all the transactions have been coded, if not the process repeats until all transactions are coded.

Figure 2:
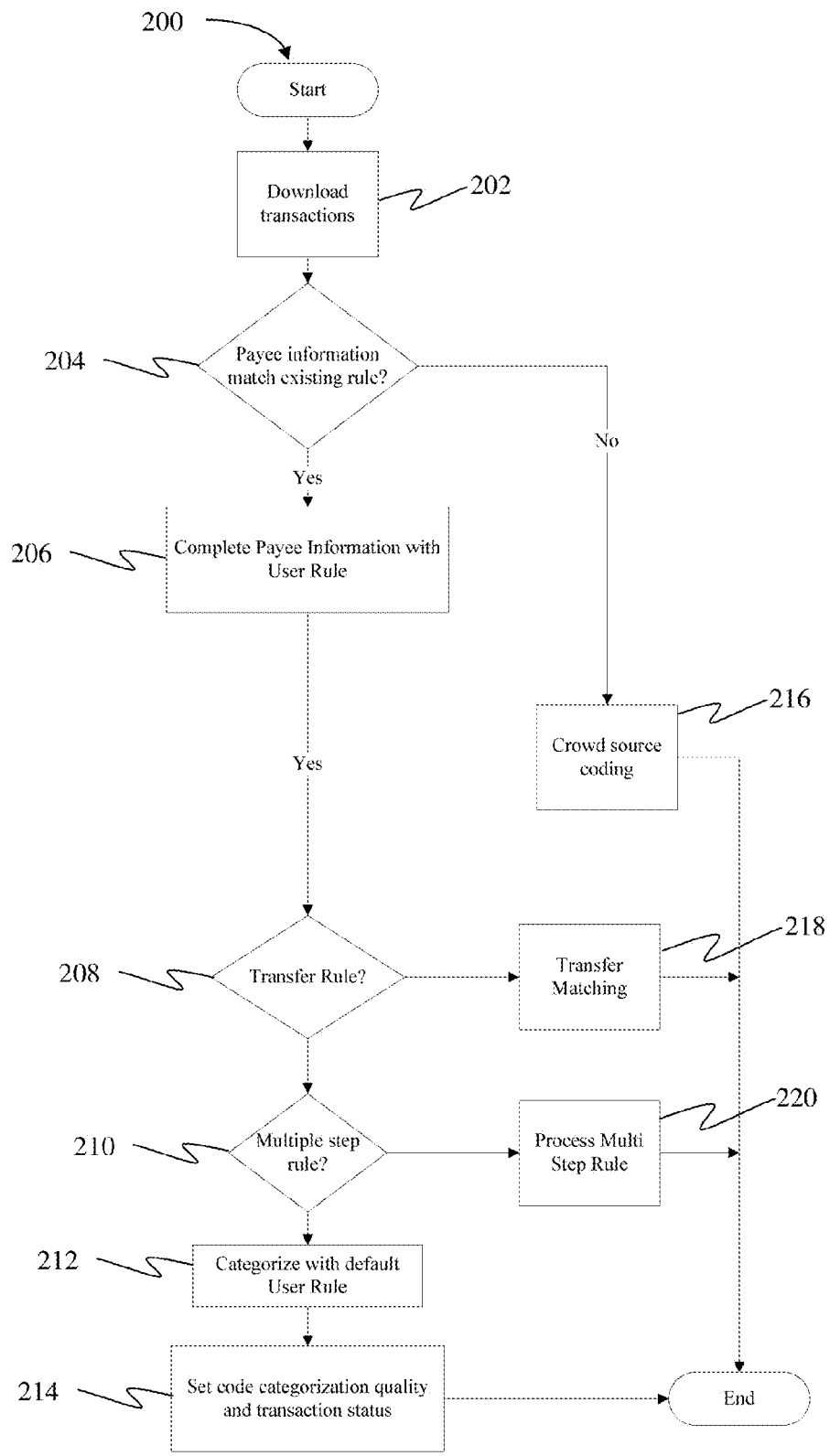
FIG. 2 is a flowchart diagram of some steps for a method of automatic transaction coding useful for the system of FIG. 1.

Referring now to FIG. 2, there is shown a flowchart diagram 200 of some steps for a method of automatic transaction coding useful for the system of FIG. 1. A determination 204 of the downloaded transactions 102 is made to determine if payee information matches an existing rule. If the payee information matches an existing rule, then, the payee information is completed using a user-defined rule 206. Next, determination is made 208 if this is a transfer rule. If the user rule is a transfer rule 208 them the data subs for transfer matching 218. Else, determination is made if this is a multi-step rule 210. If this is a multistep rule 210 then the data is sent for processing to a module for multistep rules. Else, a default usual rule 212 is used to categorize the transaction. Then, a categorization quality code ending transaction status code is set.

Figure 3:
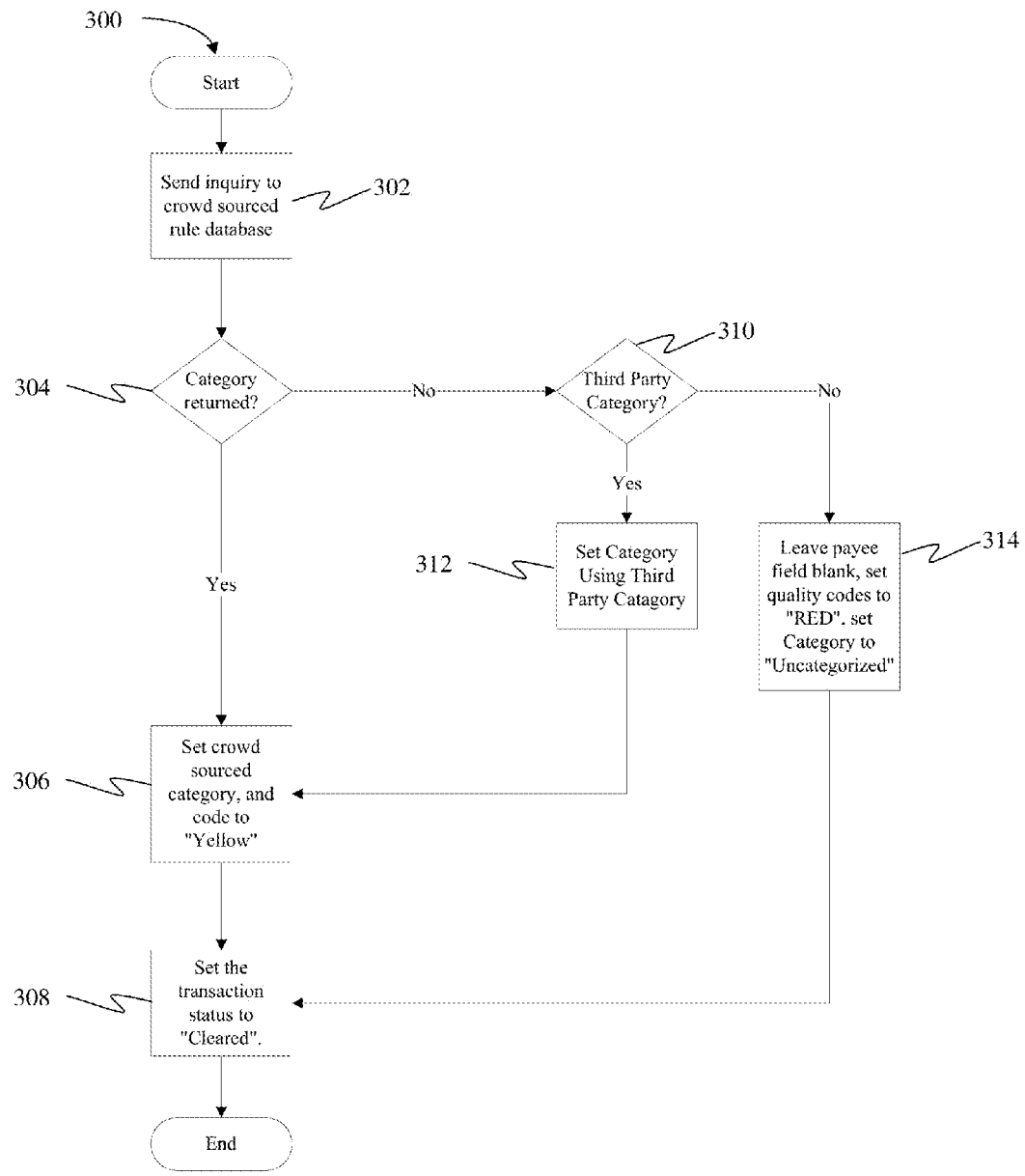
FIG. 3 is a flowchart diagram of some steps for a method of crowd sourcing transaction coding useful for the system of FIG. 1.

Referring now to FIG. 3, there is shown a flowchart diagram 300 of some steps for a method of crowd sourcing transaction coding useful for the system of FIG. 1. Once the data has been received inquiry is sent to the crowd sourced rule database 302. If the category is returned 304, then the crowd source category is set in a transaction code is set to yellow 306. Next the transaction status is set cleared 308. If no category is returned 304, then a determination is made if it is a third-party category 310. If it is a third-party category then, the categories set using the third-party category 312. Then the crowd source category is set and the transaction code is set to yellow 306, and the transaction status is set to cleared 308. If it is not a third-party category 310, then no entry is made in the payee field 314, the quality code is set to red, and the category is set to uncategorized.

In another embodiment, the system can use the NAICS system for refining crowd sourced results The NAICS system is the current U.S. standard for the classification of businesses by industry type. Users of the system will identify themselves by industry, and the crowd sourcing feature will provide improved results. For example, Home Depot® can be classified as "Repairs & Maintenance" by most Bed & Breakfasts, but "Cost of Goods Sold" by most contractors.

Use of zip codes can be used for refining crowd sourced results. Zip codes are the current U.S. standard for the classification of businesses by region. Users of the system will identify their zip code, and the crowd sourcing module will provide improved results specific to the user's local area. For example, "Ace Supply" a generic company name can be classified as "Office Supplies" in an area where "Ace Supply" is the name of an office supply company, but to the general ledger account "Cost of Goods Sold" in a zip code where a company by this name is a roofing supplier to contractors.

Figure 4:
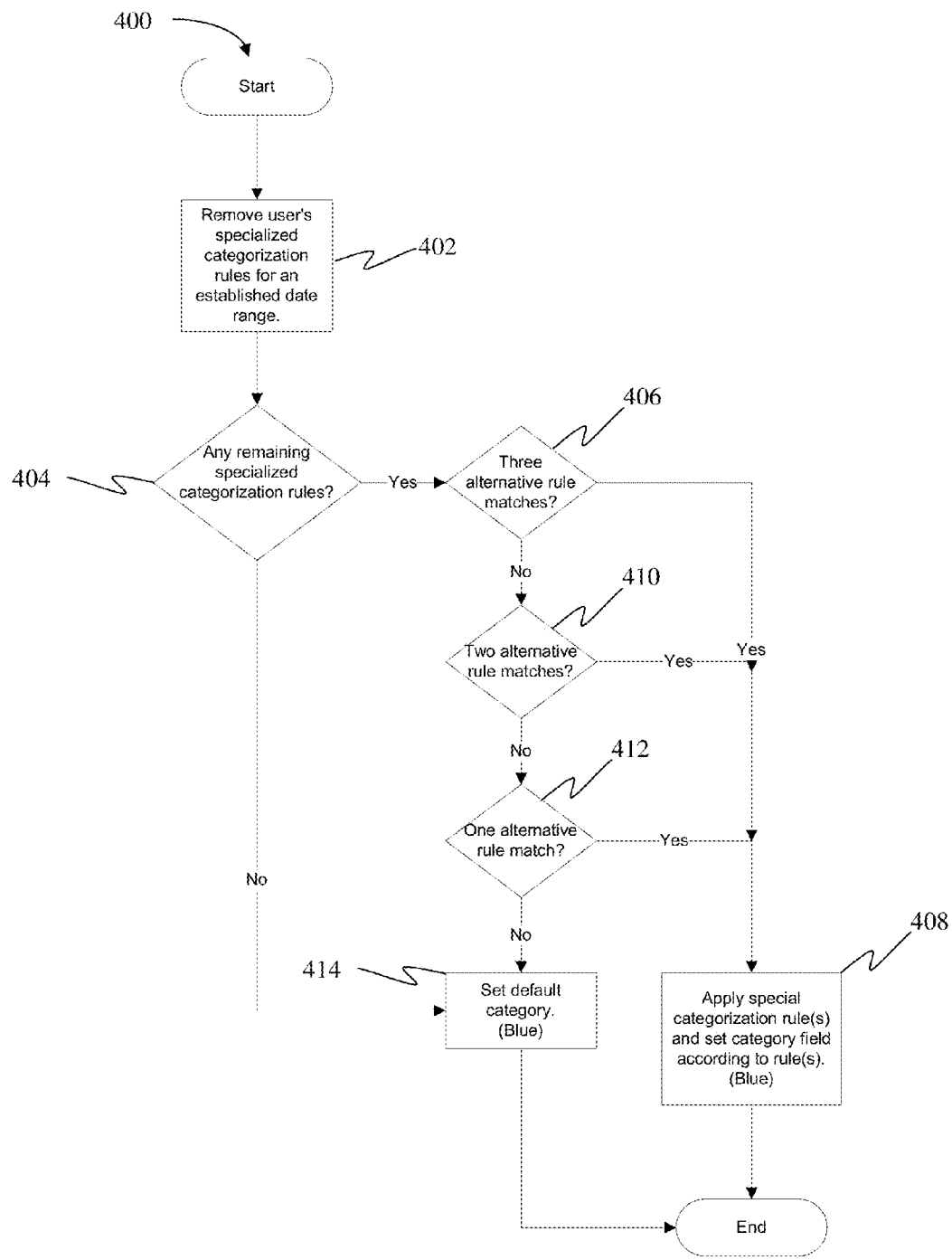
FIG. 4 is a flowchart diagram of some steps for a method of multiple step transaction coding useful for the system of FIG. 1.

Referring now to FIG. 4, there is shown a flowchart diagram 400 of some steps for a method of multiple step transaction coding useful for the system of FIG. 1. First, the user specialized categorization rules for an established date range are removed 402. Then, a determination is made 404 if there are any remaining specialized categorization rules. If there are no special categorization rules, then, the category is set to a default of blue 414. If there are remaining specialize categorization rules, then a determination 406 is made whether there are 3 alternative rule matches. If there are 3 alternative rule matches 406 then, any specialized categorization rules and category fields are set according to the rules 408. Else, a determination is made for 10 if there are 2 alternative rule matches. If the answer is yes then those special categorization rules are applied and the category fields are set according to the rules 408. Otherwise if there is only one alternative rule match 412 then that's alternative rule is applied 408 and the category field is set according to that rule. Finally if there are no special categorization rules remaining the rest of the categories are set to the default blue 414.

Figure 5:
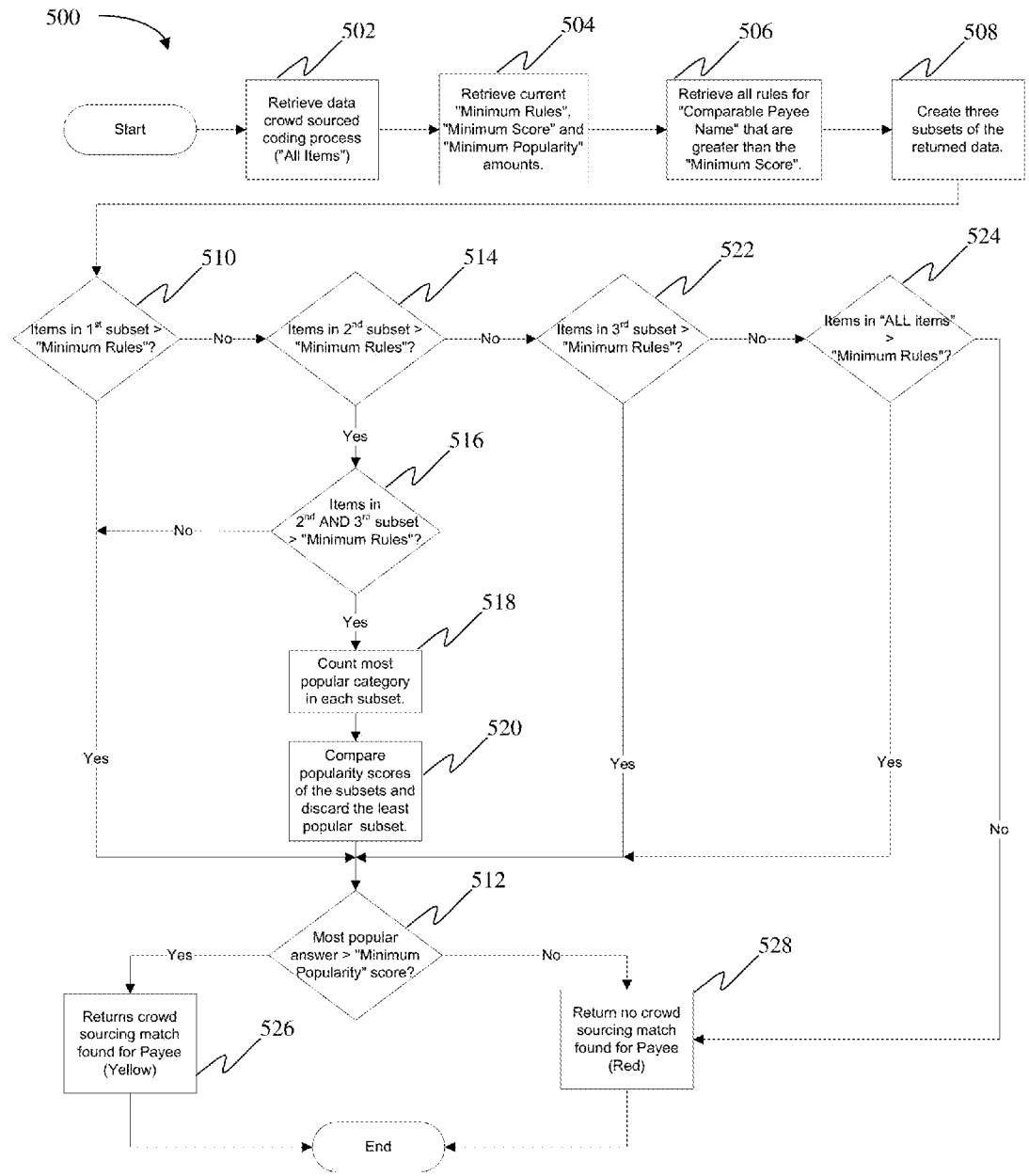
FIG. 5 is a flowchart diagram of some steps for a method of crowd sourcing in one embodiment of FIG. 3.

Referring now to FIG. 5, there is shown a flowchart diagram 500 of some steps for a method of crowd sourcing in one embodiment of FIG. 3. As can be seen, first, transaction data from a crowd sourced coding process is retrieved 502 from the storage. Next, current minimum rules, minimum score and minimum popularity amounts are retrieved 504. Then, all rules for comparable payee name that are greater then the minimum score are retrieved 506 from the storage. Next, if the number of items in a first subset is greater than the minimum rules 510, a comparison is made to check if the most popular answer is greater them a minimum popularity score 512. If the answer is yes, a crowd sourcing match for the payee is returned the transaction color of yellow 526. However, if the most popular answer is not greater than the minimum popularity score then no crowd sourcing much is found for the payee in the transaction color is set for the payee is red 528. If the items in the first subset are not greater than the minimum rules 510, then the check is performed to determine if the items the 2nd subset are greater than the minimum rules 514. If this is the case, then a determination is made whether the items in the 2nd in the 3rd subset are greater than the minimum rules 516. If they are not then most popular answer greater than the minimum popularity score 512 decision is made. If the 2nd and 3rd subset items are greater than the minimum rules then the most popular category in each subset is counted 518. Next, the popularity scores of the subsets are compared and the least popular subset is discarded 520. If the items in the 2nd subset are not greater than the minimum rules then decision is determined whether the items in the 3rd subset are greater than the minimum rules 522. If this is the case, then the most popular answer greater than minimum popularity score 512 decision is made. If the items in 3rd subset are not greater than the minimum rules 522 dinner decisions made whether items "all items" are greater than the minimum rules 524. If the answer is no crowd sourcing match is found the payee in the transaction is returned with the color coding of red.

Crowd sourcing relies upon default user rules for a payee and not user transactions. That portion of the system that uses crowd sourced data to determine a general ledger account categorization employs only the data set we've defined as the default user rule for a particular payee/vendor. By identifying it as the default rule with the user and strongly encouraging their careful selection of that default rule the system derives a higher quality answer for that vendor from the user.

Crowd sourcing employs these "comparable payee" names. The sanitized version of the name the bank uses for the payee will be used to match transactions downloaded by other users with a crowd sourced general ledger categorization. Thus the categorizations from that set of users who've established default rules for "ATTM ALPHARETTA GA" will be used as the data set.

The system provides administrator tools to refine results of crowd sourcing. The system administrator will be able to establish minimum scores for the following: user scores to contribute to the crowd sourced database, minimum counts of total codings for a payee to establish a reasonable minimum dataset, and minimum popularity ratings within that data set before an answer can be presumed to be consensus.

Figure 6:
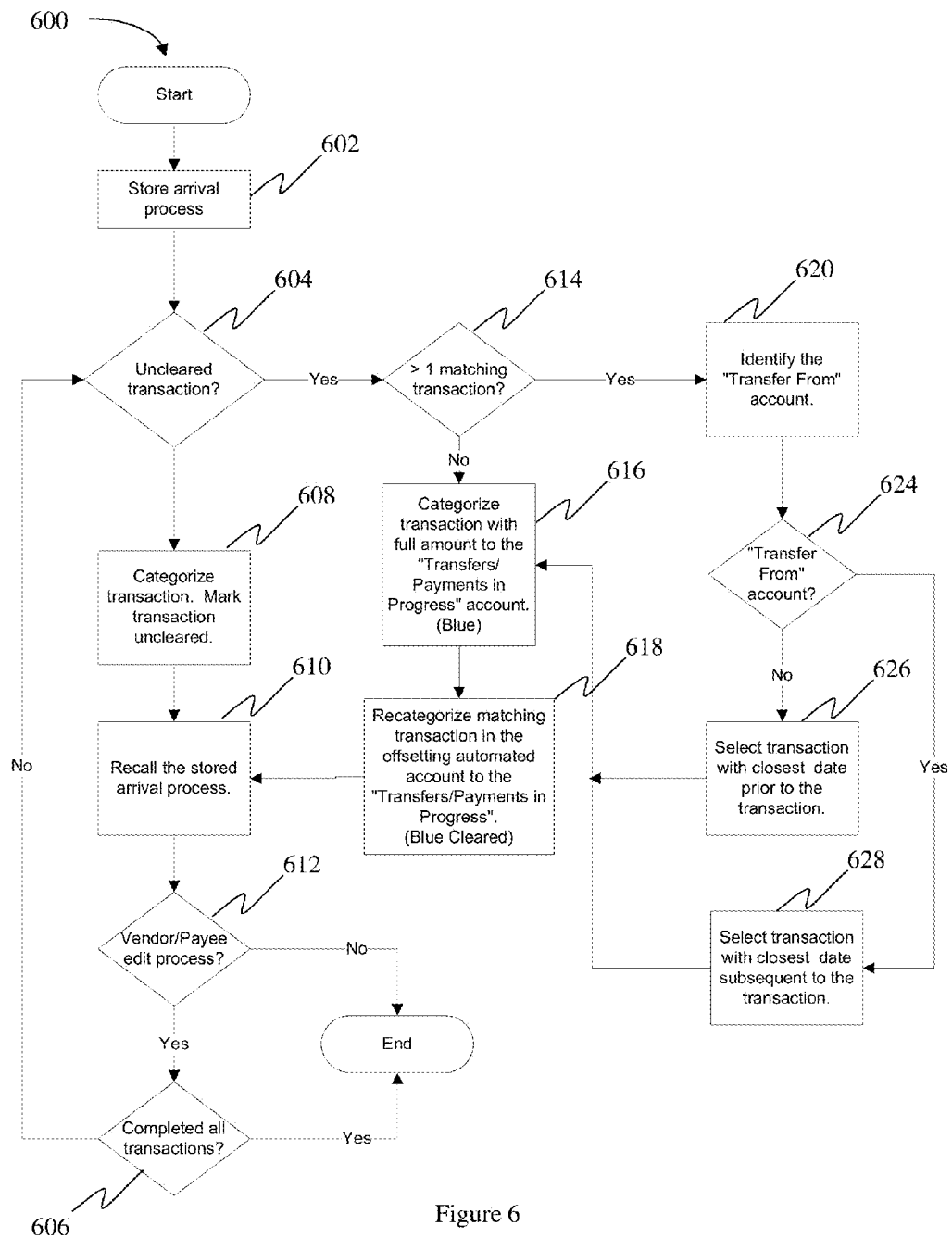
FIG. 6 is a flowchart diagram of some steps for a method of transfer matching useful for the system of FIG. 1.

Referring now to FIG. 6, there is shown a flowchart diagram 600 of some steps for a method of transfer matching useful for the system of FIG. 1. 1st, data arrives from the store arrival process 602. Next, a determination is made if this is an unclear transaction 604. If the transaction is not cleared, then, the transactions categorized and marked uncleared 608. Then, the stored arrival process is recalled 610. Next, a decision is made whether or not to invoke the vendor/payee edit process 612. If the answer is no, the process ends. However, if he answers yes, a check is made to determine if all transactions have been completed 606. If all transactions are cleared the process also ends. If there are more transactions to process the steps are repeated.

For an unclear transaction a determination is made if there's more than one matching transaction 614. If the answer is yes, then an identity of the transferred from account is made 620. Next, if there is a transfer from account a transaction with closest date subsequent to the present transaction is selected 628. If there is no transferred from account, then a transaction with close date prior to the present transaction is selected 626. Then, the transaction is categorized with the full amount to the transfers/payments in progress account 616, and the transaction color is set to blue. Next, any matching transaction in the offsetting automated account to the transfers/payments in progress account is re-categorized 618, and the transaction color is cleared. Then, the stored procedure arrival process is recalled 610 and processing continues from that point as if it was a cleared transaction.

In one embodiment, the system automatically creates payee associations as user works. In addition as users identify their payee/vendor for particular transactions downloaded from the bank the system will create an association between the banks description of the payee and vendors established in the accounting system. For example the following actual bank vendor description: "ATTM*12200479999ALPHARETTAGA" could become associated with the user's "AT&T Wireless" vendor information. Once established all further payments which have this bank vendor name would be associated with this particular vendor of the user.

Users are not prompted to create payee associations. Unlike prompting to create general ledger coding rules where the user is specifically asked if they want to set this categorization as the default, users who have just selected one of their payees to match a bank payee description will NOT be prompted to establish a permanent association, but one will be established by default. As the payee descriptions from the bank appear to be very unique, difficulties with this approach are unlikely.

Users are able to view and deactivate payee/vendor associations. Should there be unforeseen difficulties, users will be able to view and deactivate these associations in their vendor edit area.

The system "sanitizes" bank vendor description to improve comparability. Bank vendor descriptions will have comparable versions created with standard programming techniques. For example "ATTM*12200479999ALPHARETTAGA" could be reduced to "ATTM ALPHARETTA GA".

The system stores comparable version of vendor name with user's vendor information. "ATTM*12200479999ALPHARETTAGA" which was already stored as an bank payee name associated with the user's vendor "AT&T Wireless", will also be associated with "ATTM ALPHARETTA GA".

The system allows for entry of "open" transactions in automated accounts. Although all transactions will ultimately be downloaded from the bank, users will be able to enter "open" transactions in an automated accounting, which will be matched with the bank transaction when it "clears". This will provide for more accurate bank balances, as well as provide the payee data for paper checks which is rarely available from downloaded bank transactions The system automatically matches transactions between two automated accounts, as a payment from one account (bank) to another (credit card) will actually be downloaded twice, system will treat any transfer between accounts as an open transaction until the matching transaction arrives from the other account.

Figure 7:
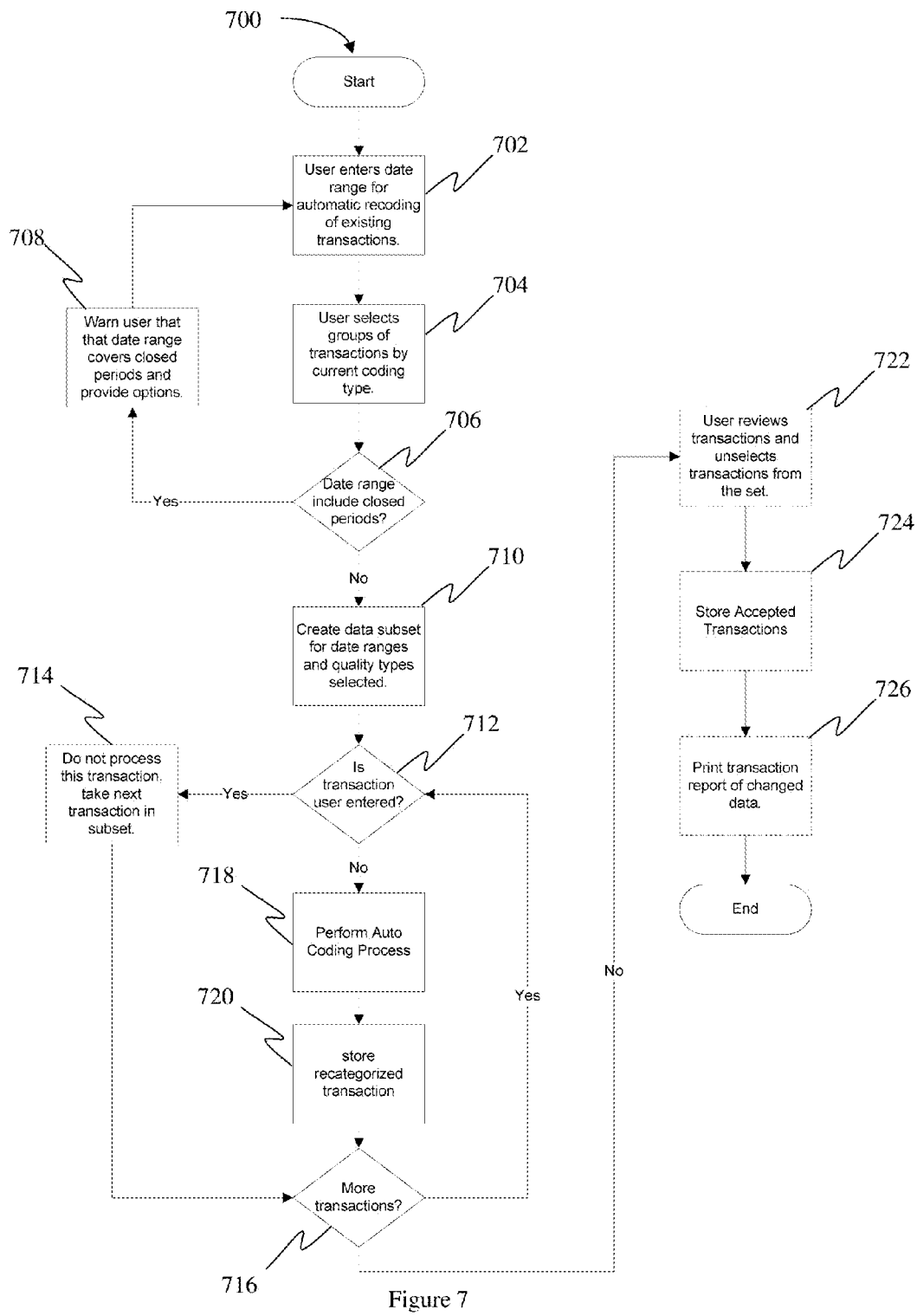
FIG. 7 is a flowchart diagram of some steps for a method of transaction coding useful for the system of FIG. 1.

Referring now to FIG. 7, there is shown a flowchart diagram 700 of some steps for a method of transaction coding. As can be seen, a user enters a date range for automatic recoding of an existing transaction 702. Then, the user selects groups of transactions by the current coating type 704. Next, the date range is checked to see if it includes closed periods 706. If the answer is yes, the user is warned that the date range covers closed and is provided options 708. Otherwise, a data subset is created for the date ranges and quality types selected 710. Then, the transaction is checked to see if it has been entered by the user 712. If the answer is yes. The transaction is not processed, and the next transaction in the subset is reviewed 714. If the transaction has not been entered by the user, then the system performs an auto coding process 718. Next, the recategorized transaction is stored 720 in a storage. Then, if there are more transactions, the steps are repeated until all the transactions in the date range subset selected have been recategorized 716. Then, if there are no more transactions, the user reviews the transactions and I am selects transactions from the previously selected set 722. Optionally, the accepted transactions can be stored in the system 724. Further optionally, the user can print a transaction report of the changed data 726.

Users are prompted to recode existing transactions. After classifying or reclassifying a transaction for a vendor, the user will be provided a list of similar transactions which have not previously been hard coded by them which fit this vendor. User will be able to individually deselect transactions in the list and affirm they would like those remaining coded similarly.

Users are "scored" based on the quality of the books they've kept. An algorithm will score each user from zero to 1 (0% to 100%) on the quality of their books based on various metrics, including percentage of uncategorized, crowd sourced, and hard coded transactions, the extent to which they've properly setup their accounting system, whether their transactions have been kept up to date, and other factors. This score will serve two purposes: to "gamify" the keeping of good books by showing their status while hinting at methods for improving their score, and to eliminate from the crowd sourced database those users with poor scores.

Users are provided with guidance as to the status of particular transactions. The system will not only automatically identify payees and categorize a transaction, but will provide detailed guidance to the users of the system as to which transactions might need their attention. A system that categorized transactions automatically doesn't help the user who needs to have high quality books and records, in that they must still visit and reconsider every transaction to assure them that it's been recorded correctly. By clearly identifying which transactions are unknown/uncategorized (Red), crowd sourced (Yellow), categorized automatically by user rule (Blue), and hard coded by the user (Green) the user will be able to quickly focus on those transactions that need their attention. Each of these transaction types will also receive a mathematical score, sometimes varying within a type like crowd sourced so we can more fully identify transactions the user should verify.

The system will have the ability to completely recode a date range of transactions for the user. As both the user rules and especially the crowd sourced database are learning databases, our system will have the capacity to set a date range and have all the transactions for that date range resubmitted for automated coding. This will be especially helpful with unclassified transactions, but may also upgrade or improve the already crowd sourced ones and/or apply new user rules previously missed.

Figure 8:
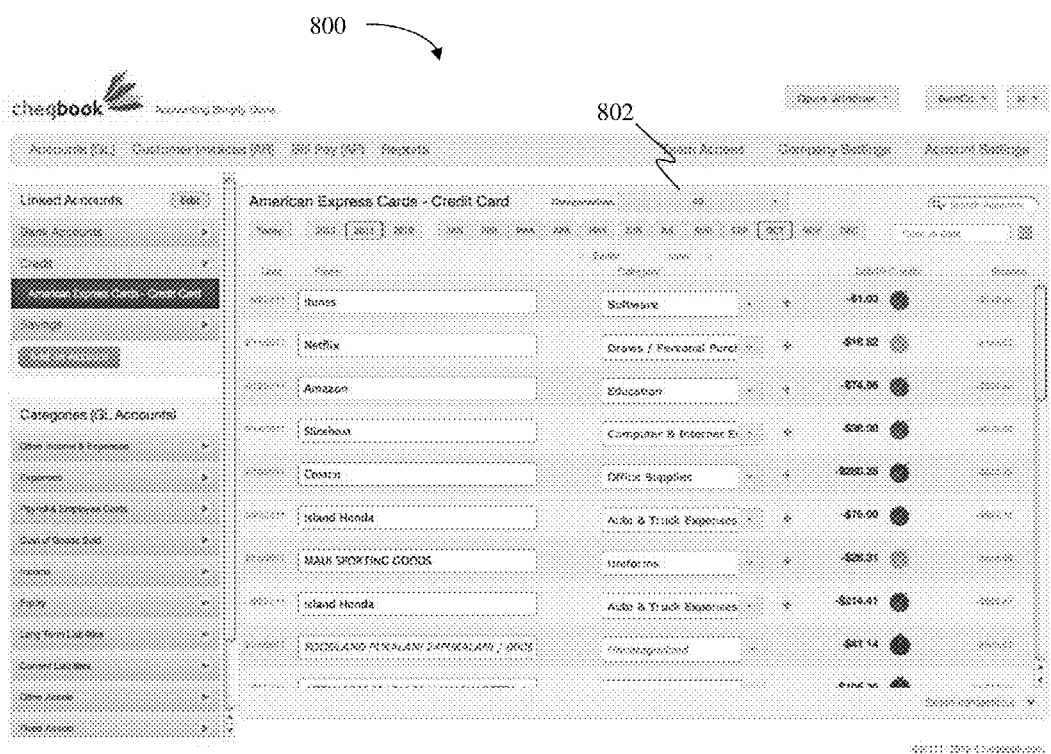
FIG. 8 is a screenshot of the system showing all transaction classifications by color.

Referring now to FIG. 8, there is shown a screenshot 800 of all transactions, showing classifications by color. As can be seen in this screenshot 800, the categorization 802, has been selected to display all transactions in an unfiltered manner. This allows the user to quickly see which transactions have been categorized by the user (in green), automatically categorized (in blue), crowd sourced categorized (in yellow) or uncategorized (in red).

Figure 9:
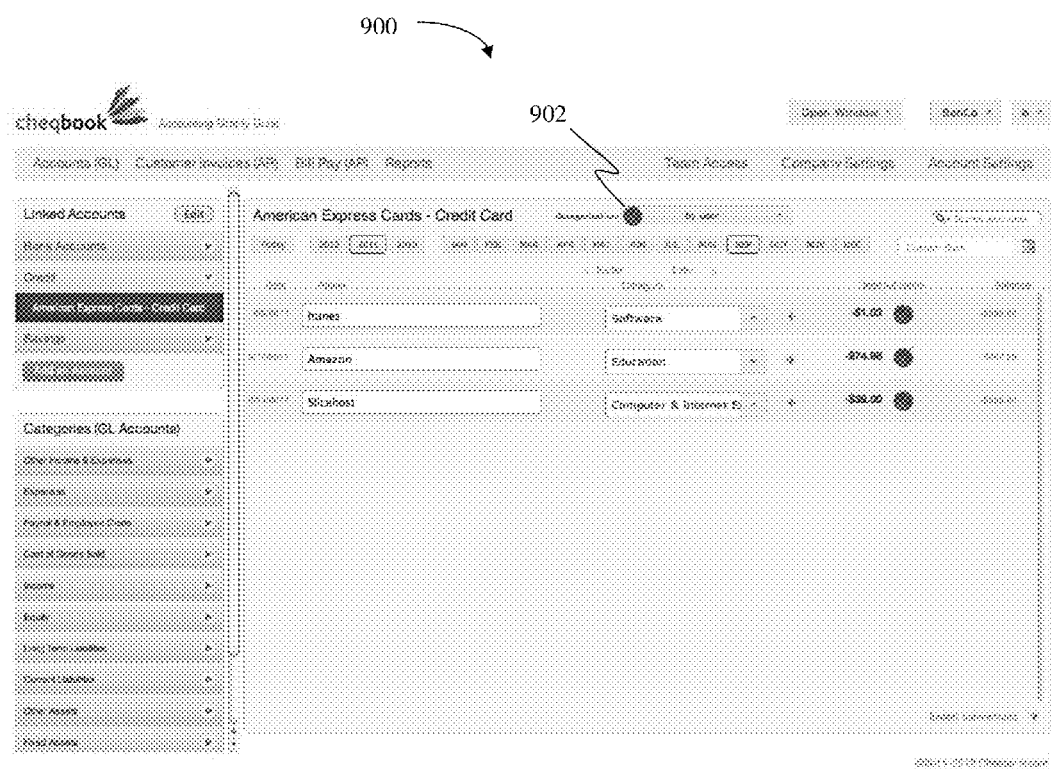
FIG. 9 is a screenshot of the system showing all green transactions filtered by the system of FIG. 1.

Referring now to FIG. 9, there is shown a screenshot 900 of the system showing all green transactions filtered by the system. As can be seen in this screenshot 900, the categorization 902, has been selected to display all transactions categorized by the user as shown in green.

Figure 10:
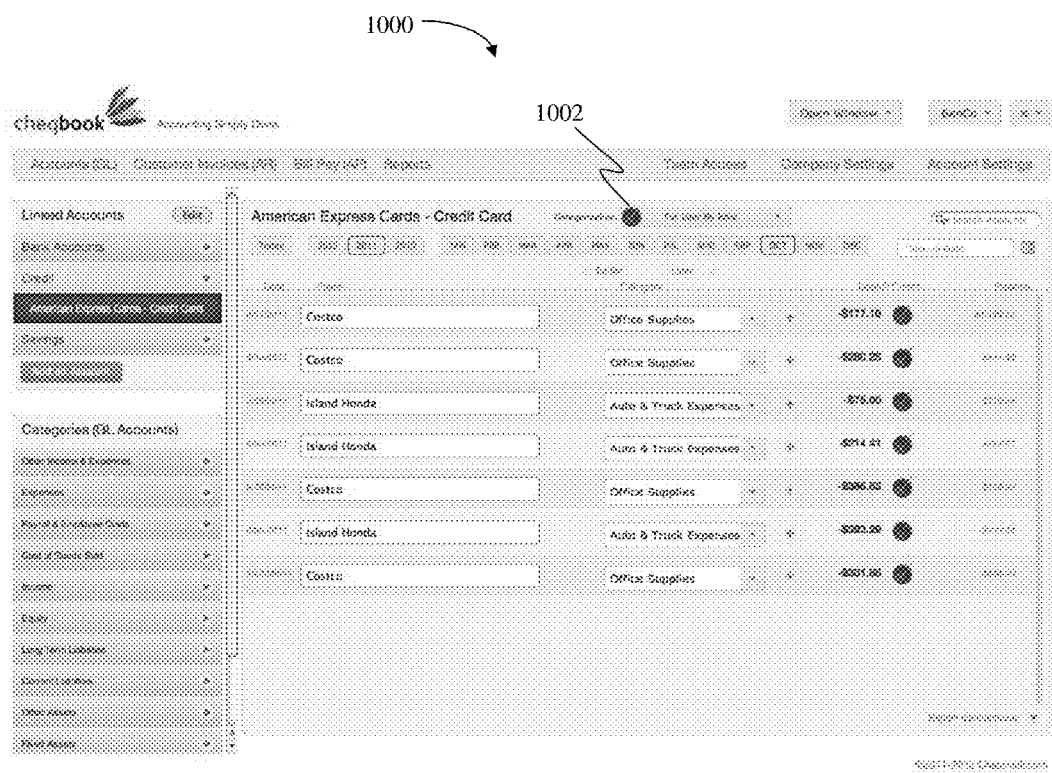
FIG. 10 is a screenshot of the system showing all blue transactions filtered by the system of FIG. 1.

Referring now to FIG. 10, there is shown a screenshot 1000 of the system showing all blue transactions filtered by the system. As can be seen in this screenshot 1000, the categorization 1002, has been selected to display all transactions that have been categorized for the user automatically, as shown in blue.

Figure 11:
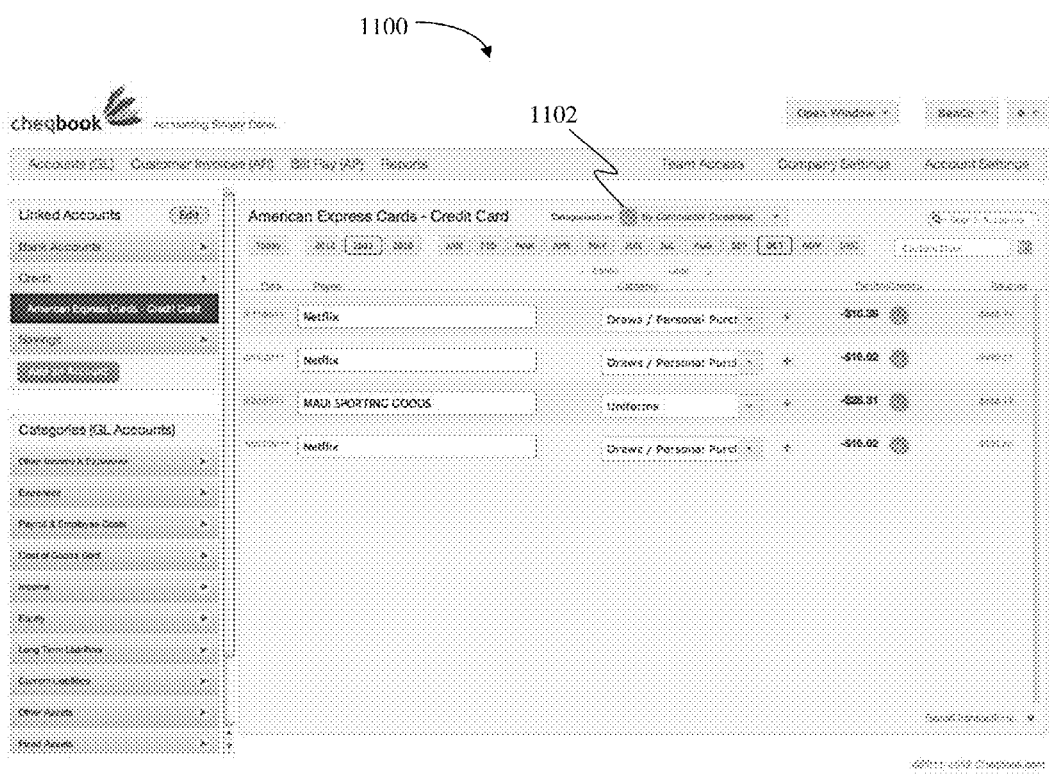
FIG. 11 is a screenshot of the system showing all yellow transactions filtered by the system of FIG. 1.

Referring now to FIG. 11, there is shown a screenshot 1100 of the system showing all yellow transactions filtered by the system. As can be seen in the screenshot 1100, the categorization selection 1102, has been selected to display all transactions that have been automatically categorized using crowd sourcing for the user, as shown in yellow.

Figure 12:
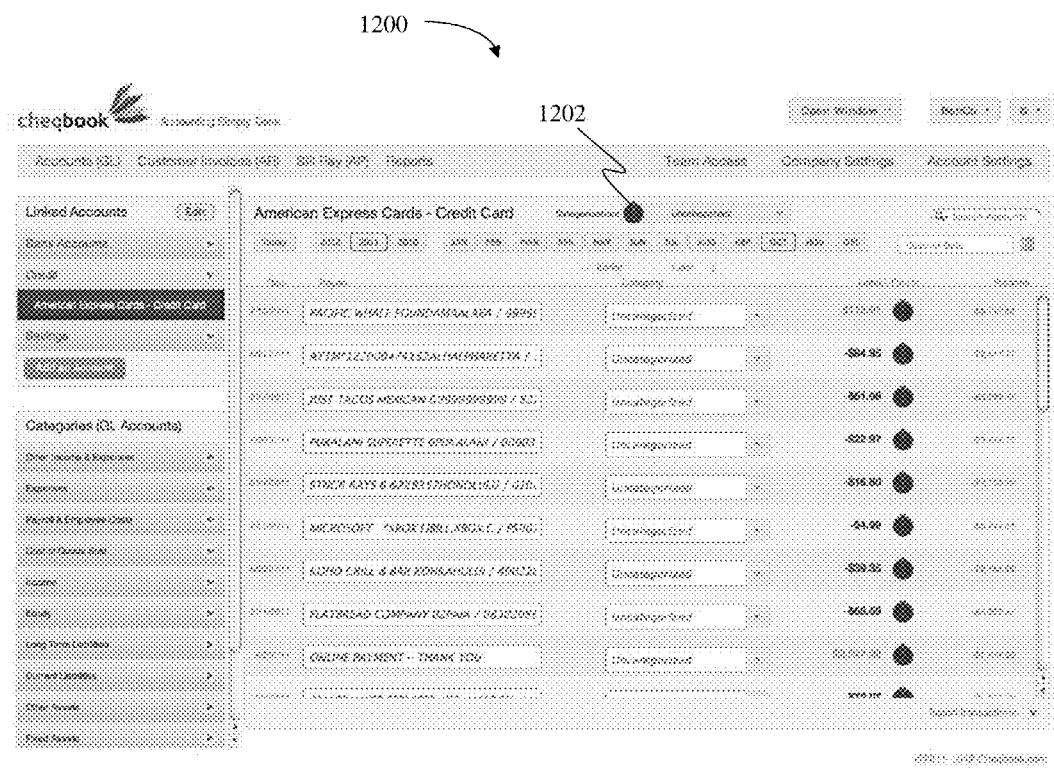
FIG. 12 is a screenshot of the system showing all red transactions filtered by the system of FIG. 1.

Referring now to FIG. 12, there is shown 1200 a screenshot of the system showing all red transactions filtered by the system. As can be seen in the screenshot 1200, the categorization selection 1202, has been selected to display all transactions that have not been categorized, as shown in red.

The importance of the above five screenshots cannot be emphasized enough. Whether it is color, numbers, symbols, glyphs, grouping by accuracy, or any other method of identification, the user is quickly and efficiently presented with only those transactions that need attention after being automatically categorized. The existing prior art records the transactions without any indication of accuracy (drop in), quarantines incoming transactions awaiting the users approval. This system records all transactions directly into the general ledger like drop in, but then provides at a glance assessment of the "quality" (the statistical accuracy) of each transaction. This allows users to spend their time more effectively and efficiently only on those transactions with a lower quality score and avoid the time consuming process of reviewing the majority of transactions known to have a high likelihood of accuracy.

Figure 18:
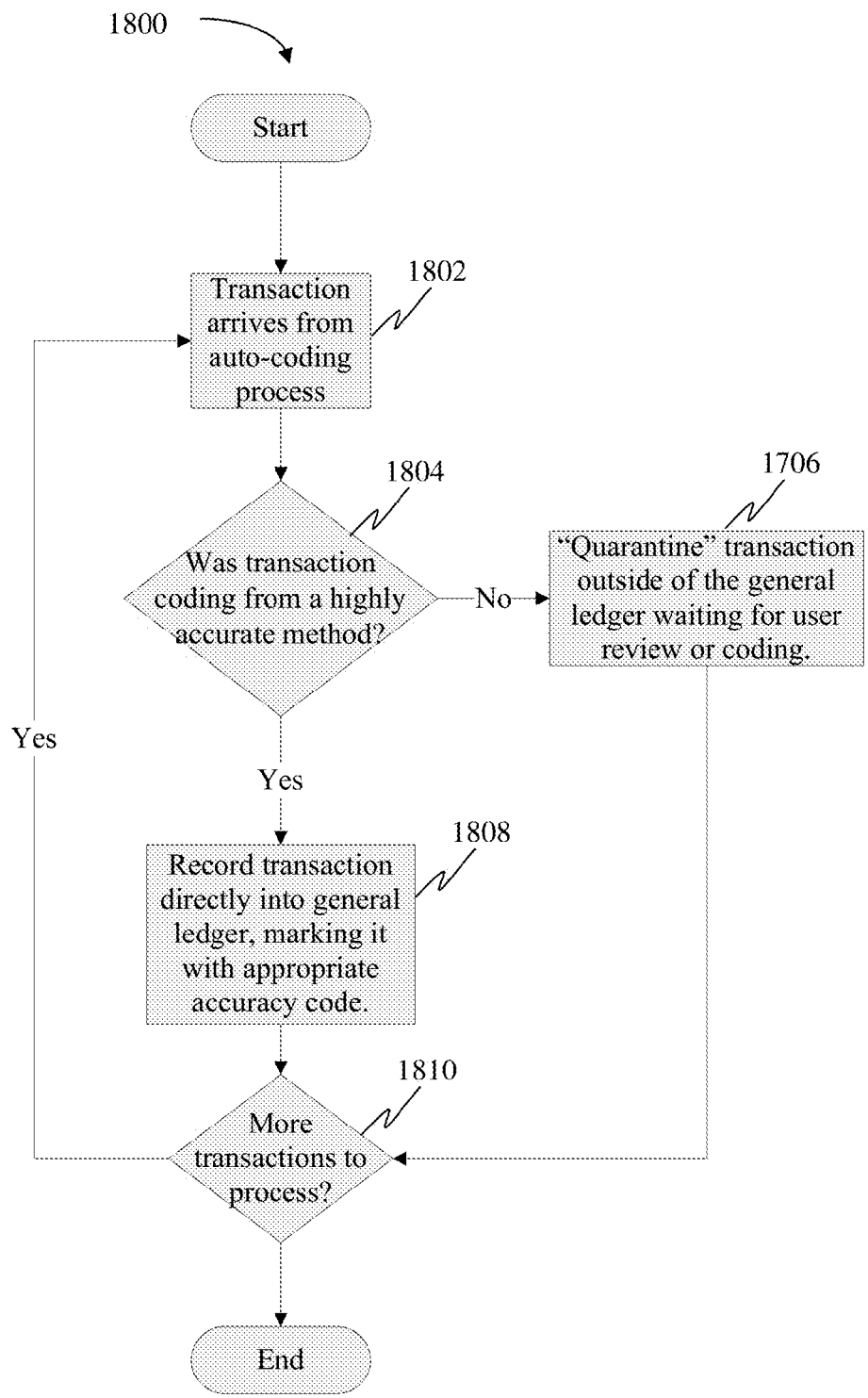
FIG. 18 is a flow chart of some steps of a method to quarantine transactions with a low probability of accuracy.

Referring now to FIG. 18, there is shown a flow chart 1800 of some steps of a method to quarantine transactions with a low probability of accuracy. As can be seen, the transactions arrive from the auto-coding process 1802. Then, a determination is made if the transaction is coded using an accurate coding method 1804. Optionally, the user can adjust an accuracy setting for the determination using a graphical user interface provided by the system 100. Next, if the transaction does not meet the minimum standard of accuracy, the transaction is stored in a quarantine storage to await the users to review and change the transaction code manually for each transaction. If, however, the transaction is of a sufficient accuracy, then the transaction is recorded 1808 directly into the general ledger marked with an appropriate accuracy code. Each of the above steps is repeated 1810 until there are no more transactions to process.

The system 100 can use the assessment of each transactions quality to "quarantine" transactions with a low probability of accuracy. For example, all transactions that are uncategorized or have a reliability code that is red can be held stored and the user can be prompted to code those transactions before they are combined with existing transactions (before they are "dropped in"). The system can also store all crowd sourced transactions with a reliability code of yellow apart from the general ledger until the transactions have been approved or recoded by the user. Additionally, the user can select what level of quarantine the system will apply, such as, for example, quarantine just red transactions, quarantine red and yellow transactions, or quarantine red, yellow and blue transactions pending user approval. Note, the use of color-coding as the reliability indicator for the system is by way of example only. It will be understood by those with skill in the art with reference to this disclosure that indications of estimated transaction accuracy can be represented by colors, numbers, symbols, or glyphs or even represented only by the act of quarantining itself. Whatever way this approach is implemented it relies upon the sharing of estimated transaction accuracy with the user so that the user can more quickly and efficiently focus on those transactions that require attention.

Figure 13:
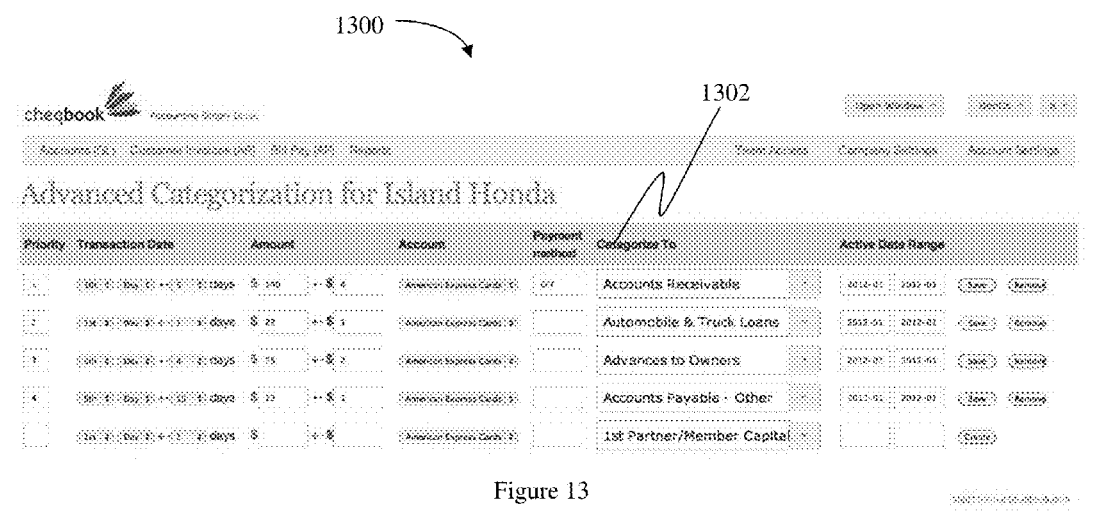

Referring now to FIG. 13, there is shown a screenshot 1300 of the system of FIG. 1 displaying a payee edit screen. As can be seen, this screenshot 1300 provides an interface to the user for editing and modifying the chart of payees 1302.

Figure 14:
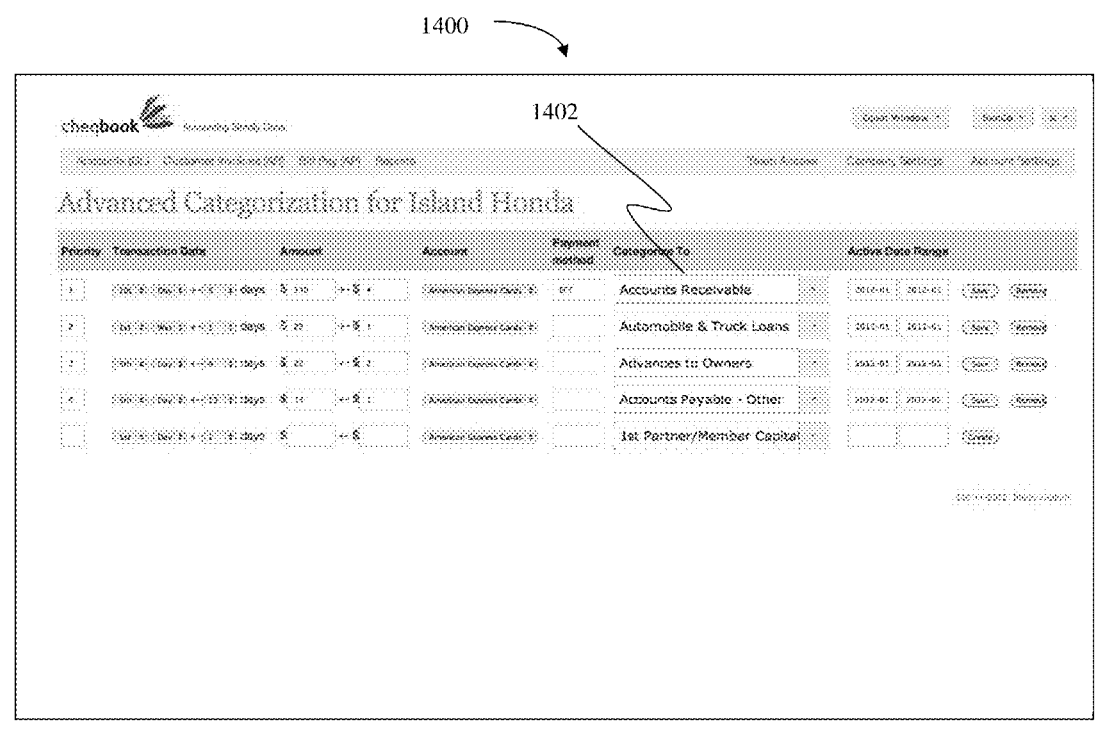

Referring now to FIG. 14, there is shown a screenshot 1400 of the system of FIG. 1 displaying advanced categorization options for the system. As can be seen in the screenshot 1400, the system provides an interface for the user to alter the categorizations of transactions 1402.

Figure 15:
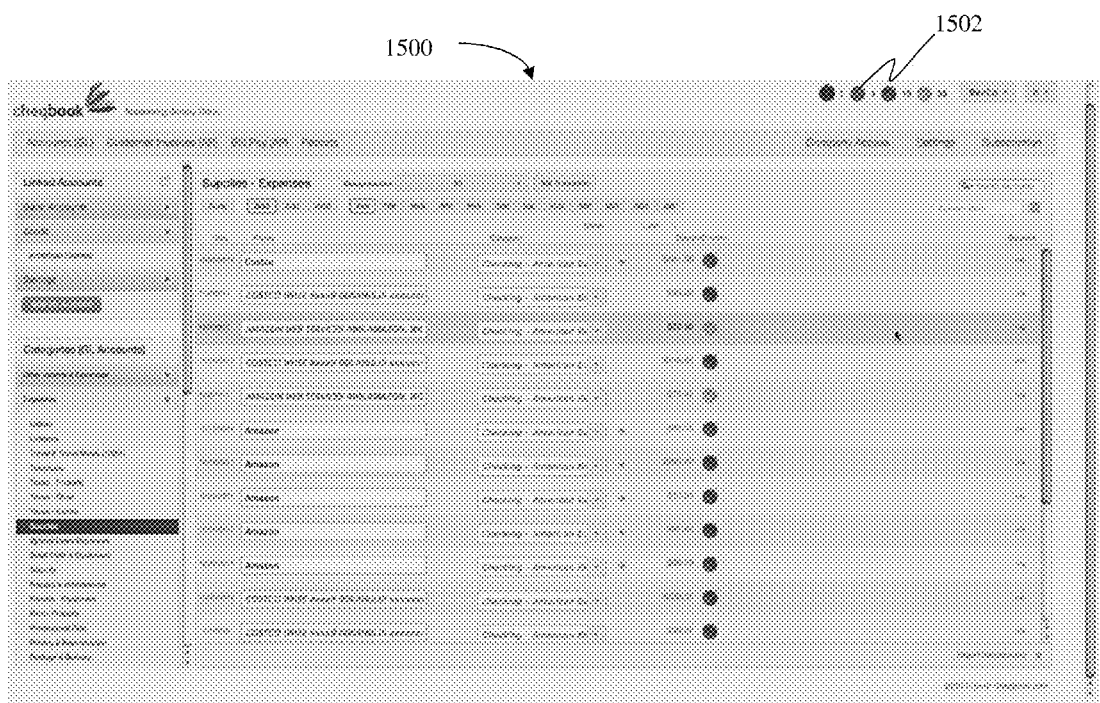
FIG. 15 is a screenshot of another embodiment of the system of FIG. 1 displaying all categorizations.

Referring now to FIG. 15, there is shown a screenshot 1500 of another embodiment of the system of FIG. 1 displaying all categorizations. As can be seen, in this embodiment, 1500 each of the separately categorized transactions 1502 are shown on top of the screen area providing the user with an instantaneous analysis of the amount of transactions in each category. Additionally, the user can click on either one of the transaction categories 1502 and the system will display all the transactions in that category. This increases the efficiency and speed for users in identifying which categories actually need attention immediately, and those that can be delayed for review.

Figure 16:
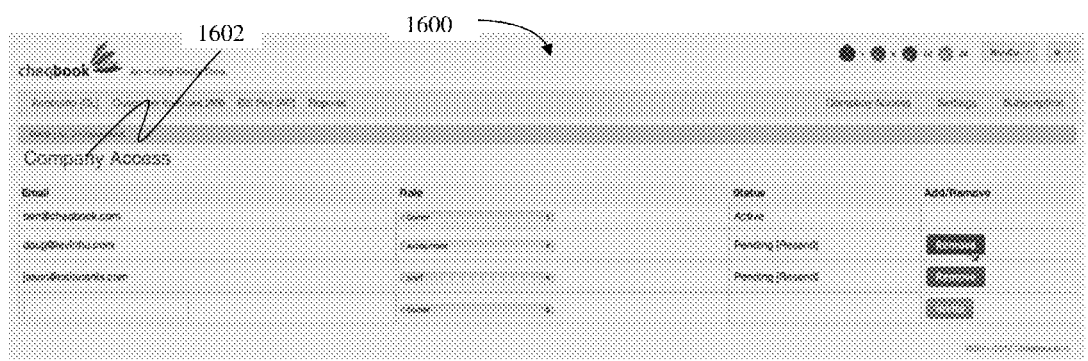
FIG. 16 is a screenshot showing different access levels provided for multiple users of the system of FIG. 1.

Referring now to FIG. 16, there is shown a screenshot 1600 showing different access levels provided for multiple users of the system of FIG. 1. Another feature of the present invention is shown in the screenshot 1600. In this embodiment, a user can give other entities access to their accounting information 1602. This allows the user to give access to trusted individuals, such as, for example, an accountant, so that all their transaction information can be either reviewed, analyzed, exported or downloaded to another system for processing. Additionally, if there are multiple locations where accounting information can be entered, each user can have a permission level to enter that information without the need to send it to a centralized location. Also, these permissions can set granular controls so that certain areas of the accounting information are restricted for different users.

Figure 17:
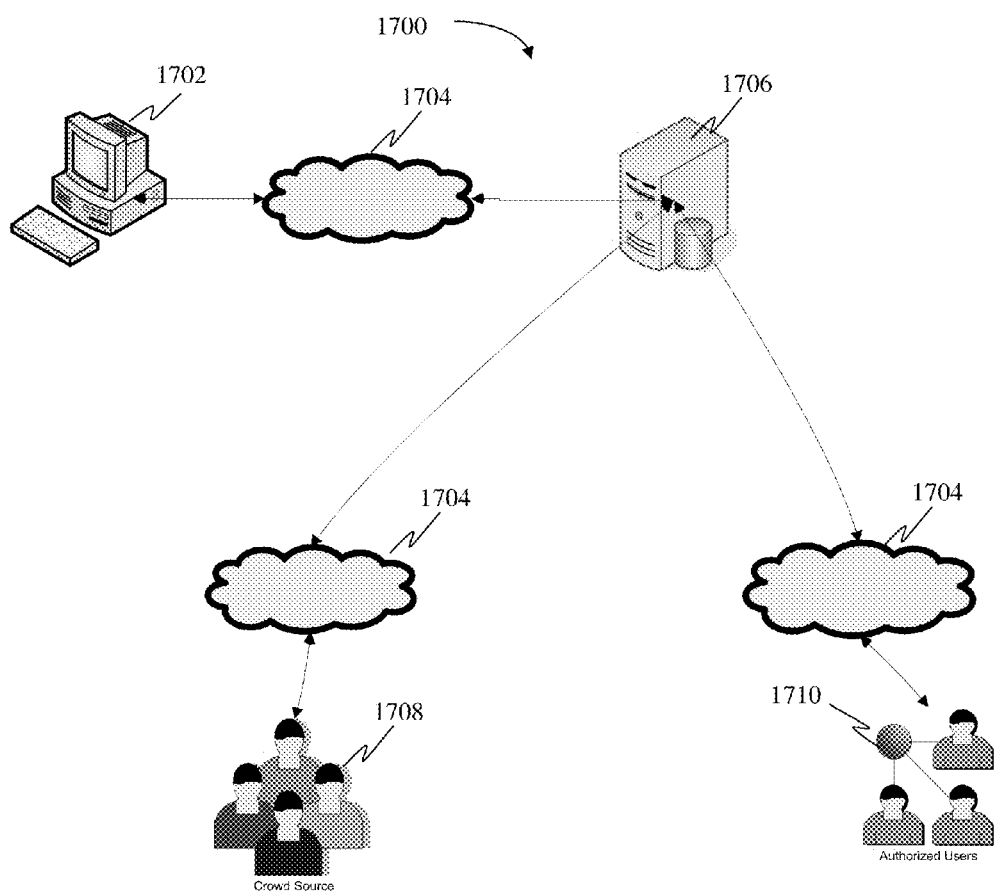
FIG. 17 is a system diagram of one embodiment of the present invention.

Referring now to FIG. 17, there shown a system diagram 1700 of one embodiment of the present invention. As can be seen, the system comprises one or more than one computer 1702 for accessing the system. The one or more than one computer 1702, accesses the system through the Internet 1704 and one or more than one server 1706 that contains the computer instructions for operating the system. Other users 1708 also using the system 1706 through the Internet 1704, are used as input for the crowd sourcing algorithms contained within the system 1706. Authorized users 1710, also access the system 1706 through the Internet 1704. Each of the authorized users 1710 can have separate permissions for accessing the system 1706.

What has been described is a new and improved system and method for an accounting system and management methods of transaction classifications that is simple, accurate and self-adapting, overcoming the limitations and disadvantages inherent in the related art.

Although the present invention has been described with a degree of particularity, it is understood that the present disclosure has been made by way of example. As various changes could be made in the above description without departing from the scope of the invention, it is intended that all matter contained in the above description or shown in the accompanying drawings shall be illustrative and not used in a limiting sense.

What is claimed is:

1. A computer implemented accounting system and transaction classification management method for categorizing transactions for a user comprising the steps of:
 a) receiving a plurality of transactions, each transaction including a transaction party, a date associated with the transaction, and a transaction amount;
 b) providing a set of transaction categories;
 c) automatically associating one of the transaction categories with at least one of the received transactions from the set of transaction categories;
 d) providing a set of reliability codes comprising at least two reliability codes, wherein the reliability codes are selected from the group consisting of colors, numbers, animations and glyphs;
 e) selecting a reliability code from the set of reliability codes for at least one of the automatically selected transaction categories; and
 f) displaying at least one of the received transactions with its selected reliability code.

2. The method of claim 1 wherein the step of automatically selecting a transaction category comprises selecting a transaction category based on transaction categories used by other users.

3. The method of claim 1 wherein the transaction party is displayed in the color of the reliability code.

4. The method of claim 1 wherein the set of reliability codes comprises a code for a transaction category selected by the user.

5. The method of claim 4 wherein the set of reliability codes comprises a code for a received transaction that does not have an automatically selected transaction category.

6. The method of claim 4 or 5 wherein the step of automatically selecting a transaction category comprises selecting a transaction category based on transaction categories used by other users.

7. The method of claim 6 wherein the set of reliability codes comprises a code for transactions categorized based on transaction categories used by other users.

* * * * *